United States Patent
Liu et al.

(10) Patent No.: US 12,052,132 B1
(45) Date of Patent: Jul. 30, 2024

(54) CLIENT TELEMETRY FRAMEWORK FOR VIRTUAL DESKTOP INFRASTRUCTURE (VDI)

(71) Applicant: VMware LLC, Palo Alto, CA (US)

(72) Inventors: Bo Liu, Beijing (CN); Yingfeng Ou, Beijing (CN); Per Olov Larsson, London (GB); Adam Gregory Gross, Dexter, MI (US); Dong Wang, Beijing (CN); Feng Yan, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/451,078

(22) Filed: Aug. 16, 2023

(30) Foreign Application Priority Data

Jul. 21, 2023 (WO) ................ PCT/CN2023/108565

(51) Int. Cl.
| | |
|---|---|
| G06F 9/455 | (2018.01) |
| G06F 9/451 | (2018.01) |
| G06F 15/173 | (2006.01) |
| H04L 41/0654 | (2022.01) |
| H04L 67/141 | (2022.01) |

(52) U.S. Cl.
CPC .......... H04L 41/0654 (2013.01); G06F 9/452 (2018.02); H04L 67/141 (2013.01)

(58) Field of Classification Search
CPC .... H04L 41/0654; H04L 67/141; G06F 9/452
USPC ....................................................... 709/217
See application file for complete search history.

(56) References Cited

U.S. PATENT DOCUMENTS

| | | | | |
|---|---|---|---|---|
| 10,402,364 | B1 * | 9/2019 | Vajravel | H04L 67/141 |
| 11,876,689 | B1 * | 1/2024 | Patel | H04L 41/342 |
| 2010/0146504 | A1 * | 6/2010 | Tang | G06F 9/45537 718/1 |
| 2012/0089980 | A1 * | 4/2012 | Sharp | G06F 9/45558 718/1 |
| 2015/0304433 | A1 * | 10/2015 | Xiao | G06F 9/45533 709/203 |
| 2019/0340376 | A1 * | 11/2019 | Fleck | H04L 67/5683 |
| 2021/0014334 | A1 * | 1/2021 | Sun | G06F 21/6218 |
| 2022/0311822 | A1 * | 9/2022 | Nord | H04L 63/0435 |

FOREIGN PATENT DOCUMENTS

WO WO-2022203837 A1 * 9/2022 ......... H04L 63/0435

* cited by examiner

*Primary Examiner* — Ruolei Zong
(74) *Attorney, Agent, or Firm* — Kim & Stewart LLP

(57) ABSTRACT

In one set of embodiments, a Virtual Desktop Infrastructure (VDI) client running on a client device can receive first client-side data from a client telemetry service, where the first client-side data includes information pertaining to a current state of the client device. The VDI client can further retrieve second client-side data including information pertaining to the VDI client and/or a VDI session established between the VDI client and a VDI agent running on a server system, and can aggregate the first client-side data and the second client-side data to produce aggregated client-side data. The VDI client can then transmit the aggregated client-side data to the VDI agent.

21 Claims, 3 Drawing Sheets

CLIENT TELEMETRY FRAMEWORK FOR VIRTUAL DESKTOP INFRASTRUCTURE (VDI)

CROSS-REFERENCES TO RELATED APPLICATIONS

The present application claims priority under 35 U.S.C. 119(a)-(d) to Foreign Application Serial No. PCT/CN2023/108565 filed in China on Jul. 21, 2023 and entitled "CLIENT TELEMETRY FRAMEWORK FOR VIRTUAL DESKTOP INFRASTRUCTURE (VDI)." The entire contents of this foreign application are incorporated herein by reference for all purposes.

BACKGROUND

Unless otherwise indicated, the subject matter described in this section should not be construed as prior art to the claims of the present application and is not admitted as being prior art by inclusion in this section.

Virtual Desktop Infrastructure (VDI) is a technology that allows user desktops and/or software applications to be hosted on remote servers and accessed by users via their local devices (e.g., the users' laptops, smartphones, tablets, etc., referred to as client devices). Example VDI platforms include VMware Horizon, Citrix Virtual Apps and Desktops, and Azure Virtual Desktop.

With the growth of VDI deployments due to remote work and other factors, it is becoming increasingly useful for VDI administrators to have access to data pertaining to the configuration, performance, and statuses of their users' client devices. For instance, the administrators may leverage such data to troubleshoot VDI client problems or to better manage client hardware and software resources. However, while there are existing mechanisms for collecting server-side data in a VDI deployment, there are no similar mechanisms for the client side.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Example VDI Deployment and Solution Overview

Figure 1:
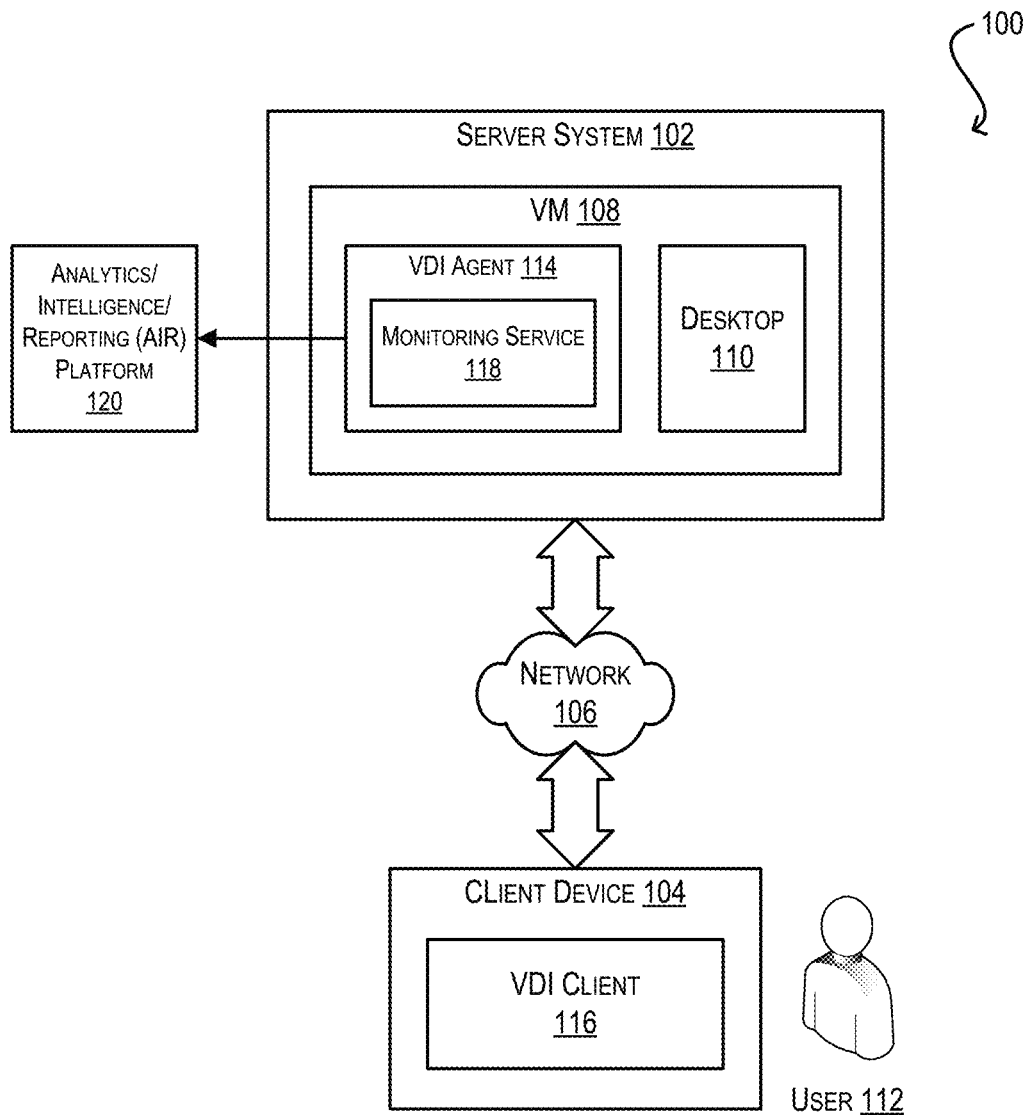
FIG. 1 depicts an example VDI deployment.

Embodiments of the present disclosure provide a telemetry framework for facilitating the collection and analysis of client-side data (i.e., data pertaining to client devices) in a VDI deployment. FIG. 1 is a simplified block diagram of an example VDI deployment 100 in which this framework may be implemented. As shown, VDI deployment 100 includes a server system 102 and a client device 104 that are communicatively coupled via a network 106 (e.g., a local area network (LAN), a wide area network (WAN), the Internet, etc.). Although only a single server system and a single client device are depicted for purposes of illustration, any number of such systems and devices may be included in VDI deployment 100 (subject to the deployment's scalability limitations).

In this example, server system 102 hosts a virtual machine (VM) 108 that runs a desktop 110 of a user 112 of client device 104. As used herein, the term "desktop" refers to a graphical computing environment in which a user can launch, interact with, and manage their software applications, settings, and data. Such desktops are provided by client operating systems (OSs) such as Windows, MacOS, Fedora Linux, and the like.

VM 108 also runs a VDI agent 114 that is configured to communicate, via a remoting protocol (e.g., Blast or PC over IP (PCoIP)), with a corresponding VDI client 116 running on client device 104. Through this communication, VDI agent 114 and VDI client 116 can "deliver" desktop 110 to user 112, or in other words enable user 112 to remotely interact with desktop 110 via client device 104 as if the desktop were running locally on that device.

As mentioned in the Background section, there are existing mechanisms for collecting data regarding the servers in a VDI deployment. For example, VDI agent 114 of FIG. 1 includes a monitoring service 118 that, upon establishment of a communication session (i.e., VDI session) S between VDI agent 114 and VDI client 116 for delivering desktop 110 to client system 104, periodically collects server-side data associated with S and transmits the collected data to an analytics, intelligence, and/or reporting (AIR) platform 120. Examples of such server-side data include an identifier (ID) of VDI session S, the remoting protocol used, network statistics observed by VDI agent 114 during S (e.g., latency, throughput, etc.), the hardware and software configurations of VM 108 and/or server system 102, server performance and usage metrics (e.g., CPU load, number of running VMs, etc.), the version number of agent 114, and so on. Upon ingesting this data, AIR platform 120 can use various techniques for deriving business or operational insights from it and for presenting the data and insights to interested parties such as the deployment's administrators.

However, there is no existing mechanism for collecting corresponding client-side data for that same VDI session S, or in other words data pertaining to the configuration, performance, and/or status of client device 104 over the duration of S. This is a significant feature gap because such client-side data would be highly useful for diagnosing/troubleshooting VDI client problems, managing client resources (e.g., identifying the need for software or hardware upgrades, etc.), and carrying out other related activities.

Figure 2:
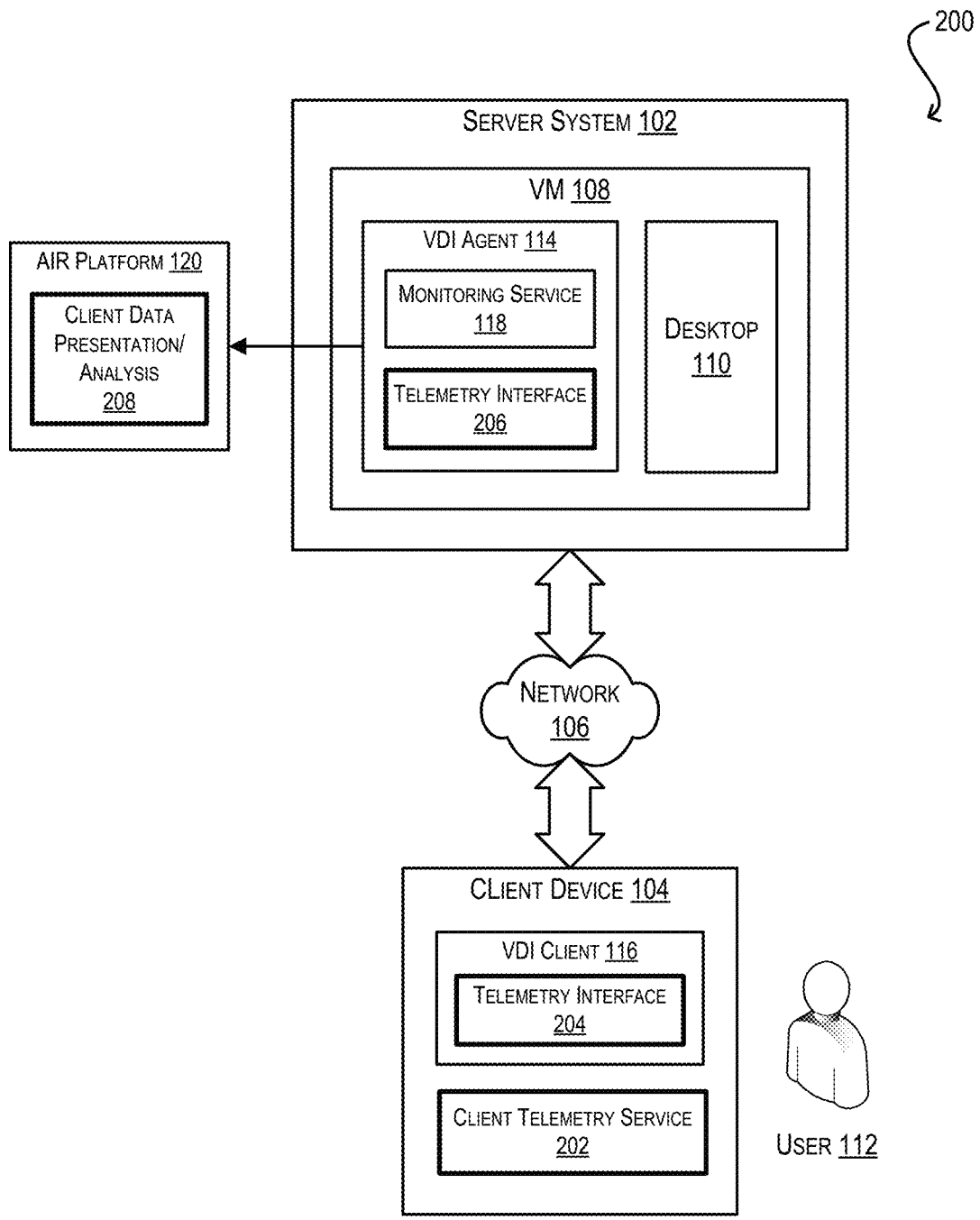
FIG. 2 depicts a VDI deployment that implements the telemetry framework of the present disclosure according to certain embodiments.

To address this gap, FIG. 2 depicts an enhanced version of VDI deployment 100 of FIG. 2 (i.e., VDI deployment 200) that implements a novel VDI client telemetry framework according to certain embodiments. As shown, the framework includes the following new components: a client telemetry service 202 on client device 104, a client-side telemetry interface 204 within VDI client 116, a server-side telemetry interface 206 within VDI agent 114, and a client data presentation/analysis module 208 on AIR platform 120. Components 202-208 may be implemented in software, in hardware, or a combination thereof.

At a high level, client telemetry service 202 is configured to collect data pertaining to client device 104 and to provide (via, e.g., an application programming interface (API) or some other mechanism) the collected data to consumers such as client-side telemetry interface 204. The kinds of data collected by client telemetry service 202 can include hardware configuration information for client device 104 (e.g., number and type of CPUs, CPU speed(s), main memory capacity, number and type of network interface controllers (NICs), number/type/capacities of storage devices, etc.), general software configuration information for client device 104 (e.g., BIOS version, name and version of OS, etc.), and hardware performance, status, and usage metrics (e.g., CPU usage, main memory usage, etc.). In certain embodiments, client telemetry service 202 can collect detailed information regarding the network connection(s) of client device 104 because such information is particularly relevant to the proper functioning of VDI, including the type of each network connection (e.g., wireless or wired), the latency and throughput for each connection, the base station name, Wi-Fi protocol, and connection quality/strength for each wireless connection, and so on.

Client-side telemetry interface 204 is configured to, during the course of a VDI session between VDI client 116 and VDI agent 114, periodically (1) receive, from client telemetry service 202, the most recent data that service 202 has collected, (2) aggregate the received data with additional client-side data that is specific to VDI client 116 and/or the VDI session (referred to herein as VDI-specific client-side data), and (3) transmit the aggregated client-side data to server-side telemetry interface 206 over a communication channel associated with the VDI session (e.g., a virtual channel dedicated for carrying telemetry data). Examples of VDI-specific client-side data include the version number of VDI client 116, the VDI session ID, the remoting protocol used by the VDI session (e.g., Blast or PCoIP), network statistics observed by VDI client 116 over the course of the session (e.g., number of packets sent, number of packets received, number of packets lost, etc.), and so on. In some embodiments, prior to step (2), client-side telemetry interface 204 may transform or filter the data received from client telemetry service 202 in a manner that is suitable for aggregation with the VDI-specific client-side data.

Upon receiving the aggregated client-side data from client-side telemetry interface 204, server-side telemetry interface 206 is configured to (1) receive, from monitoring service 118, the most recent server-side data that service 118 has collected, (3) combine the aggregated client-side data with the received server-side data, resulting in "combined client/server data," (4) apply a uniform timestamp to the combined client/server data, thereby correlating those two data sets together based on the timestamp, and (5) transmit the combined client/server data to AIR platform 120. Like client-side telemetry interface 204, in some embodiments server-side telemetry interface 206 may transform or filter the incoming client-side data prior to combining it with the server-side data.

Finally, once the combined client/server data is ingested by AIR platform 120, client data presentation/analysis module 208 is configured to present the data (via, e.g., a reporting dashboard) to interested parties like the VDI administrators. Alternatively or in addition, client data presentation/analysis module 208 can analyze the data for issues and, if warranted, automatically trigger one or more remedial actions with respect to client device 104 and/or VM 108. Examples of these actions are discussed in section (3) below.

With the telemetry framework shown in FIG. 2 and described above, several important advantages are realized. First, as mentioned previously, it fills a feature gap in current VDI platforms by enabling the collection of client-side data, which in turn allows administrators or automated agents to more easily troubleshoot VDI client problems (e.g., desktop display issues, high VDI input latency, etc.) and perform client resource management.

Second, by (1) combining, for each VDI session and for each telemetry collection time interval within that session, the client-side data collected on client device 104 and the server-side data collected on server system 102, and (2) transmitting the combined client/server data as a package with a singular timestamp to AIR platform 120, the framework of the present disclosure provides AIR platform 120 with a holistic view of the states of client device 104 and server system 102 over the course of the VDI session. This holistic view is highly beneficial for reporting and diagnostic purposes, because some VDI problems may only become evident upon observing concurrent data from both of those endpoints.

Note that an alternative and less complex telemetry approach would be for client-side telemetry interface 204 to send its aggregated client-side data directly to AIR platform 120, rather than through VDI agent 114/server-side telemetry interface 206. However, for various reasons, this alternative approach would make it significantly more difficult for AIR platform 120 to correlate that client-side data with the corresponding server-side data collected and transmitted by VDI agent 114. For example, client device 104 and server system 102 may be in different time zones, may have non-synchronized clocks, or exhibit other issues that prevent AIR platform 120 from performing this correlation in a correct and consistent manner.

The remaining sections of this disclosure discuss the operation of framework components 202-208 in greater detail according to various embodiments. It should be appreciated that FIGS. 1 and 2 are illustrative and not intended to limit the embodiments of the present disclosure. For example, although these figures depict a scenario in which server system 102 delivers a remote desktop to user 112, the telemetry framework described herein may also be implemented in VDI deployments that are designed to deliver remote applications rather than desktops.

Further, although FIGS. 1 and 2 depict a particular arrangement of components within VDI deployments 100 and 200, other arrangements are possible (e.g., the functionality attributed to a particular component may be split into multiple components, components may be combined, etc.). One of ordinary skill in the art will recognize other variations, modifications, and alternatives.

2. Data Collection Workflow

Figure 3:
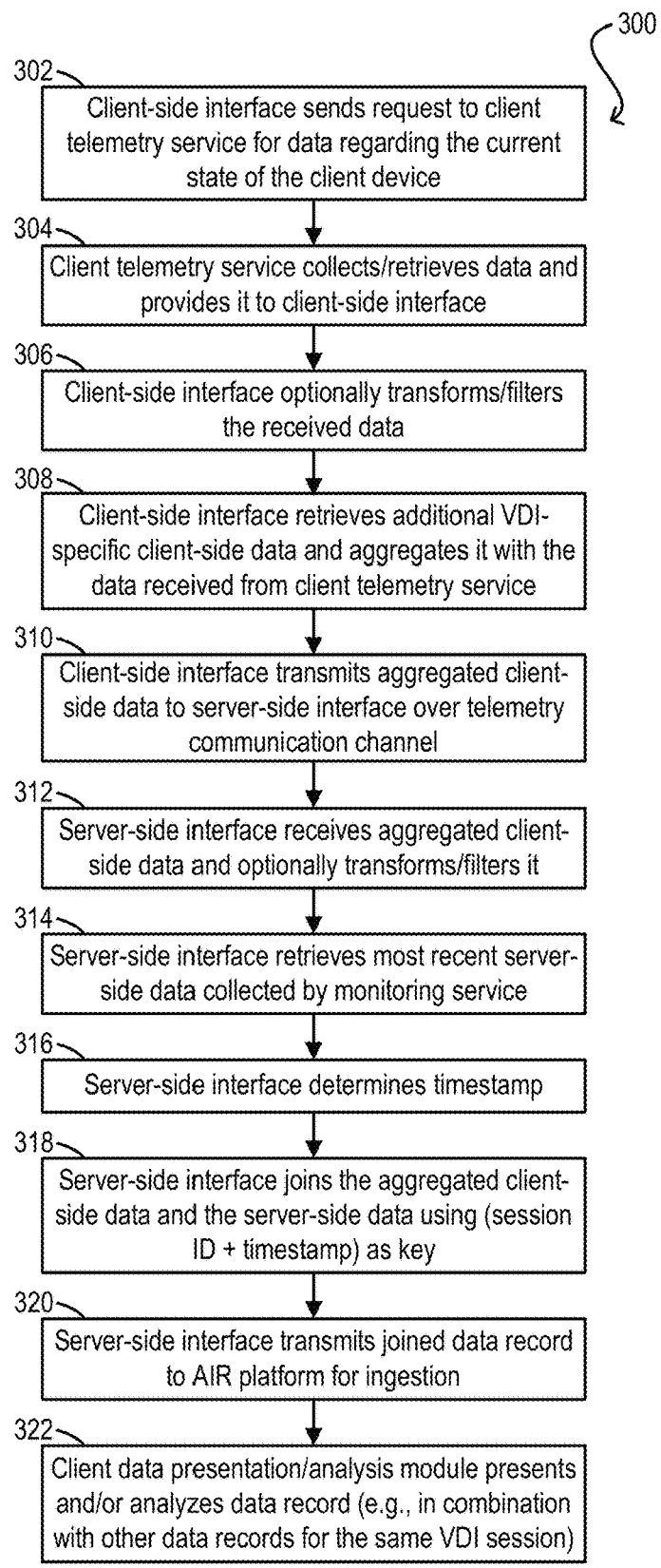
FIG. 3 depicts a data collection workflow according to certain embodiments.

FIG. 3 depicts a workflow 300 that may be performed by client device 104 and server system 102 of FIG. 2 (and more specifically, the telemetry framework components running on these entities) for collecting telemetry data pertaining to a VDI session S according to certain embodiments, where session S has been established between VDI client 116 and VDI agent 114 for the purpose of delivering desktop 110 to user 112 of client device 104. It is assumed that workflow 300 will be repeated on a periodic basis throughout the lifetime of VDI session S (e.g., every 10 seconds, every minute, etc.). This time interval, referred to herein as the telemetry collection time interval, may be configurable by the administrators of VDI deployment 200.

Starting with step 302, client-side telemetry interface 204 can send, to client telemetry service 202, a request for data regarding the current state of client device 104 (or in other words, a request for the most up-to-date client data that service 200 is designed to collect). As mentioned previously, this data can include information regarding the hardware configuration of client device 104, information regarding the software configuration of client device 104, and various hardware performance/status/usage metrics. In a particular embodiment, client telemetry service 202 can expose a telemetry API for providing such data and client-side telemetry interface 204 can invoke the API as part of step 302.

At step 304, client telemetry service 202 can collect/retrieve the requested data and provide it to client-side telemetry interface 204. In response, interface 204 can optionally transform or filter the received data (step 306). For example, client telemetry service 202 may provide current status, configuration, and performance data regarding a plurality of NICs on client device 104, but client-side telemetry interface 204 may only be interested in the particular NIC that is used for VDI session S. In this scenario, client-side telemetry interface 204 may filter out or drop all of the data pertaining to the other NICs on client device 104.

At step 308, client-side telemetry interface 204 can retrieve additional client-side data that is specific to VDI client 116/VDI session S and aggregate that with the data received from client telemetry service 202 (and optionally transformed/filtered via step 306), resulting in a set of aggregated client-side data. In this way, client-side telemetry interface 204 can incorporate VDI-specific client information into the data set that may be not accessible or visible to client telemetry service 202 (e.g., session ID, etc.). The VDI-specific client-side data retrieved at this step can include, e.g., the ID of VDI session S, network performance pertaining to the communication channel established between VDI agent 114 and VDI client 116 for S, status, and/or configuration information for S, the version number of VDI client 116, and so on.

Client-side telemetry interface 204 can then transmit the aggregated client-side data to server-side telemetry interface 206 over a communication channel established between these two components (step 310). In a particular embodiment, this communication channel can be a VDI virtual channel that is associated with VDI session S and is configured to solely carry telemetry data.

At step 312, server-side telemetry interface 206 can receive the aggregated client-side data and optionally transform/filter the data as needed (similar to step 306 performed by client-side interface 204). Server-side telemetry interface 206 can thereafter retrieve the most recent server-side data collected by monitoring service 118 (or in other words, information regarding the current state of server system 102) (step 314), determine a uniform timestamp to be applied to both the aggregated client-side data and the retrieved server-side data (step 316), and join together those two data sets based on the session ID for VDI session S and the determined timestamp (step 318). The end result of step 318 is a single, combined data record that includes both the client-side and server-side data and is keyed by session ID+timestamp.

Finally, server-side telemetry interface 206 can transmit the data record to AIR platform 120 for ingestion (step 320) and client data presentation/analysis module 208 can subsequently present and/or analyze the data record, along with other data records ingested for VDI session S, for various purposes such as reporting, business intelligence, problem troubleshooting, and so on (step 322).

It should be noted that workflow 300 is illustrative and various modifications are possible. For example, rather than joining together the client-side and server-side data at step 318 (which is a technical data operation that brings together each of these data sets into a single data record keyed by a unique key/column (e.g., session ID+timestamp)), server-side telemetry interface 206 can simply transmit the client-side and server-side data as separate data sets to AIR platform 120, along with the session ID and timestamp as additional metadata. AIR platform 120 itself can then perform the join operation on the received data sets using the session ID+timestamp as the key. This approach requires less work on the part of server-side telemetry interface 206 but also requires considerable compute performance at AIR platform 120, particularly because AIR platform 120 will be receiving telemetry data records for potentially many concurrent VDI sessions and thus will likely need to perform many joins per unit time.

As another example, rather than immediately transmitting the joined data record to AIR platform 120, server-side telemetry interface 206 may instead cache it so that it can aggregate the data records collected over multiple telemetry time collection intervals. This aggregation may involve, e.g., averaging together the values of certain fields in those multiple data records. Server-side telemetry interface 204 may then transmit the aggregated data record to AIR platform 120. This can be useful if the rate at which server-side telemetry interface 206 generates these data records is faster than the allowable ingestion rate of AIR platform 120.

3. Remedial Actions

As mentioned in section (1) above, in certain embodiments client data presentation/analysis module 208 of AIR platform 120 can analyze the data record(s) ingested for a given VDI session and, upon identifying an issue based on that analysis, automatically trigger one or more remedial actions. These remedial actions can include, e.g., sending a notification to the VDI administrators or user 112 and interacting with another system to effect some change on client device 104.

For example, consider a scenario in which client data presentation/analysis module 208 determines that client device 104 is connected wirelessly to a Wi-Fi base station and the Wi-Fi signal strength of the connection is too low to support a good VDI experience. In this case, module 208 may send a notification to user 112 informing the user of this fact and recommending that the user connect to a different base station (or switch over to using a wired connection).

As another example, consider a scenario in which client data presentation/analysis module 208 determines that the OS running on client device 104 is out of date and thus is causing compatibility issues with VDI client 116. In this case, module 108 can send a request to a client management system to automatically push an OS update to client device 104 (assuming device 104 is a managed device).

As yet another example, consider a scenario in which client data presentation/analysis module 208 determines that VDI client 116 is mis-configured on client device 104. In this case, module 108 can communicate with a VDI control plane running within the VDI deployment to automatically change/update the settings of VDI client 116.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
    receiving, by a Virtual Desktop Infrastructure (VDI) client running on a client device, first client-side data from a client telemetry service, the first client-side data including information pertaining to a current state of the client device;
    retrieving, by the VDI client, second client-side data including information pertaining to the VDI client and/or a VDI session established between the VDI client and a VDI agent running on a server system;
    aggregating, by the VDI client, the first client-side data and the second client-side data to produce aggregated client-side data; and
    transmitting, by the VDI client, the aggregated client-side data to the VDI agent.

2. The method of claim 1 wherein the receiving, retrieving, aggregating, and transmitting are repeated on a periodic basis during the VDI session.

3. The method of claim 1 wherein the first client-side data includes hardware configuration information for the client device, software configuration information for the client device, and one or more hardware performance metrics for the client device.

4. The method of claim 1 wherein the second client-side data includes an identifier (ID) of the VDI session and information regarding network performance, status, and/or configuration of the VDI session.

5. The method of claim 1 wherein the VDI client transforms or filters the first client-side data prior to the aggregating.

6. The method of claim 1 wherein upon receiving the aggregated client-side data, the VDI agent:
    retrieves server-side data pertaining to a current state of the server system;
    determines a timestamp for the aggregated client-side data and the server-side data;
    joins the server-side data and the aggregated client-side data using a combination of a session ID of the VDI session and the timestamp as a key, resulting in a single data record; and
    transmits the data record to a data analytics, intelligence, and/or reporting (AIR) platform for ingestion.

7. The method of claim 6 wherein upon receiving the data record, the AIR platform:
    analyzes the data record to identify one or more problems with respect to the client device; and
    automatically triggers one or more actions for remediating the one or more problems.

8. A non-transitory computer readable storage medium having stored thereon program code executable by a Virtual Desktop Infrastructure (VDI) client running on a client device, the program code causing the VDI client to execute a method comprising:
    receive first client-side data from a client telemetry service, the first client-side data including information pertaining to a current state of the client device;
    retrieve second client-side data including information pertaining to the VDI client and/or a VDI session established between the VDI client and a VDI agent running on a server system;
    aggregate the first client-side data and the second client-side data to produce aggregated client-side data; and
    transmit the aggregated client-side data to the VDI agent.

9. The non-transitory computer readable storage medium of claim 8 wherein the receiving, retrieving, aggregating, and transmitting are repeated on a periodic basis during the VDI session.

10. The non-transitory computer readable storage medium of claim 8 wherein the first client-side data includes hardware configuration information for the client device, software configuration information for the client device, and one or more hardware performance metrics for the client device.

11. The non-transitory computer readable storage medium of claim 8 wherein the second client-side data includes an identifier (ID) of the VDI session and information regarding network performance, status, and/or configuration of the VDI session.

12. The non-transitory computer readable storage medium of claim 8 wherein the VDI client transforms or filters the first client-side data prior to the aggregating.

13. The non-transitory computer readable storage medium of claim 8 wherein upon receiving the aggregated client-side data, the VDI agent:
- retrieves server-side data pertaining to a current state of the server system;
- determines a timestamp for the aggregated client-side data and the server-side data;
- joins the server-side data and the aggregated client-side data using a combination of a session ID of the VDI session and the timestamp as a key, resulting in a single data record; and
- transmits the data record to a data analytics, intelligence, and/or reporting (AIR) platform for ingestion.

14. The non-transitory computer readable storage medium of claim 13 wherein upon receiving the data record, the AIR platform:
- analyzes the data record to identify one or more problems with respect to the client device; and
- automatically triggers one or more actions for remediating the one or more problems.

15. A client device comprising:
a processor; and
a non-transitory computer readable medium having stored thereon program code for a Virtual Desktop Infrastructure (VDI) client that, when executed, causes the processor to:
- receive first client-side data from a client telemetry service, the first client-side data including information pertaining to a current state of the client device;
- retrieve second client-side data including information pertaining to the VDI client and/or a VDI session established between the VDI client and a VDI agent running on a server system;
- aggregate the first client-side data and the second client-side data to produce aggregated client-side data; and
- transmit the aggregated client-side data to the VDI agent.

16. The client device of claim 15 wherein the receiving, retrieving, aggregating, and transmitting are repeated on a periodic basis during the VDI session.

17. The client device of claim 15 wherein the first client-side data includes hardware configuration information for the client device, software configuration information for the client device, and one or more hardware performance metrics for the client device.

18. The client device of claim 15 wherein the second client-side data includes an identifier (ID) of the VDI session and information regarding network performance, status, and/or configuration of the VDI session.

19. The client device of claim 15 wherein the VDI client transforms or filters the first client-side data prior to the aggregating.

20. The client device of claim 15 wherein upon receiving the aggregated client-side data, the VDI agent:
- retrieves server-side data pertaining to a current state of the server system;
- determines a timestamp for the aggregated client-side data and the server-side data;
- joins the server-side data and the aggregated client-side data using a combination of a session ID of the VDI session and the timestamp as a key, resulting in a single data record; and
- transmits the data record to a data analytics, intelligence, and/or reporting (AIR) platform for ingestion.

21. The client device of claim 20 wherein upon receiving the data record, the AIR platform:
- analyzes the data record to identify one or more problems with respect to the client device; and
- automatically triggers one or more actions for remediating the one or more problems.

* * * * *